Oct. 24, 1967

J. L. LASS ET AL 3,349,004

NUCLEAR REACTOR FUEL BUNDLE

Filed Jan. 17, 1966

INVENTORS
JAMES L. LASS
DOMINIC A. VENIER

BY

Oct. 24, 1967  J. L. LASS ETAL  3,349,004
NUCLEAR REACTOR FUEL BUNDLE
Filed Jan. 17, 1966  7 Sheets-Sheet 2

INVENTORS
JAMES L. LASS
DOMINIC A. VENIER
BY
Charles P. Curry

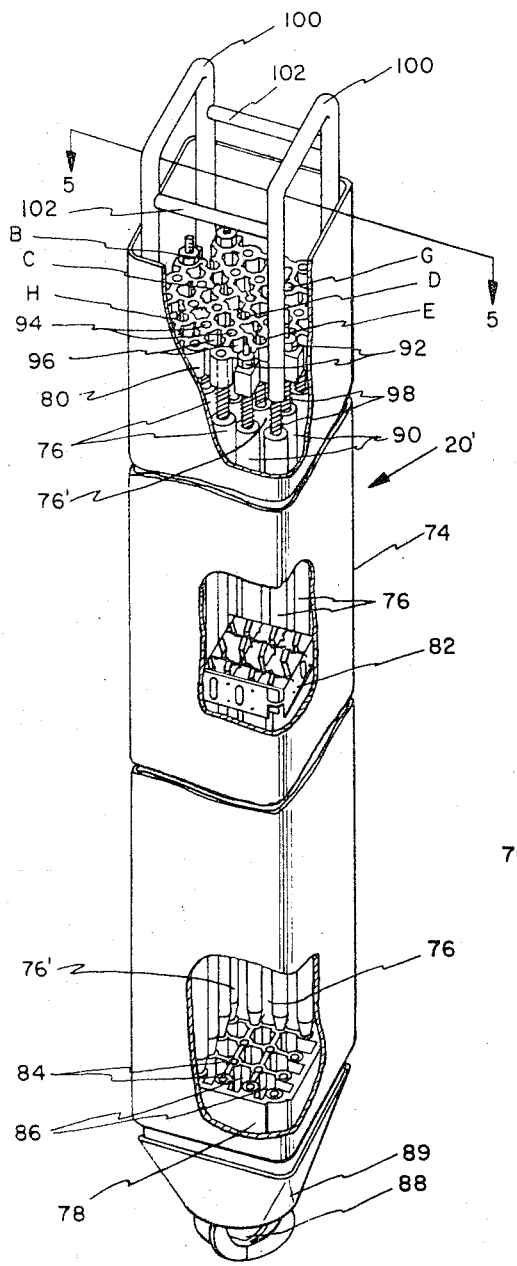
Fig. 4.
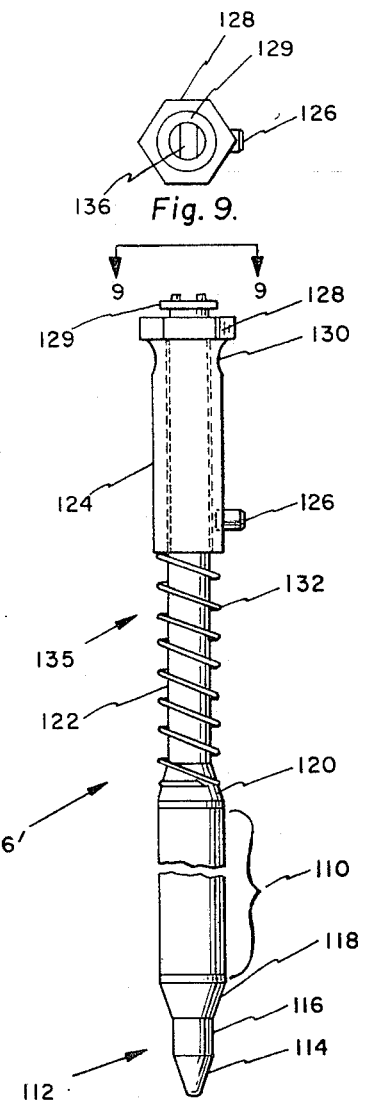
Fig. 9.
Fig. 8.

Oct. 24, 1967   J. L. LASS ETAL   3,349,004
NUCLEAR REACTOR FUEL BUNDLE
Filed Jan. 17, 1966   7 Sheets-Sheet 4
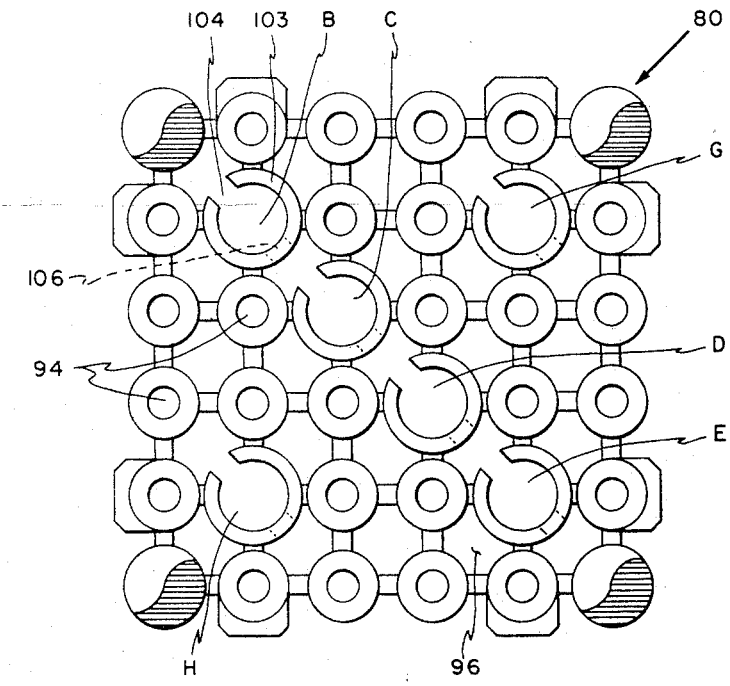
Fig 5
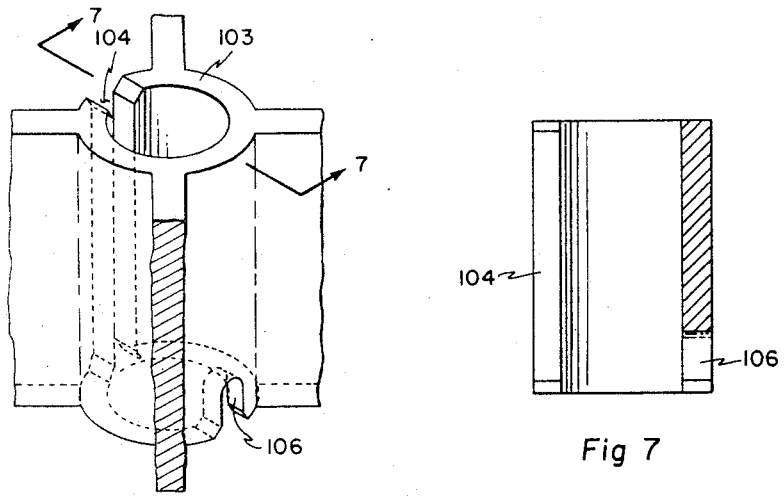
Fig 6
Fig 7
INVENTORS
JAMES L. LASS
DOMINIC A. VENIER
BY

INVENTORS
JAMES L. LASS
DOMINIC A. VENIER

Oct. 24, 1967 J. L. LASS ET AL 3,349,004
NUCLEAR REACTOR FUEL BUNDLE
Filed Jan. 17, 1966 7 Sheets-Sheet 7

INVENTORS
JAMES L. LASS
DOMINIC A. VENIER
BY
Charles H3 Curry

United States Patent Office 3,349,004
Patented Oct. 24, 1967

3,349,004
NUCLEAR REACTOR FUEL BUNDLE
James L. Lass and Dominic A. Venier, San Jose, Calif., assignors to General Electric Company, a corporation of New York
Filed Jan. 17, 1966, Ser. No. 521,119
9 Claims. (Cl. 176—78)

ABSTRACT OF THE DISCLOSURE

This disclosure describes a nuclear reactor fuel bundle having a plurality of fuel rods, including one or more easily removable special neutron absorber rods positioned in one or more locations in the fuel bundle substantially along a line of rod positions which intersects the longitudinal axis of the fuel bundle and the extension of which intersects the longitudinal axis of an adjacent control rod. In a square fuel bundle this line is represented by a diagonal line that intersects the corner of the fuel bundle nearest the longitudinal axis of an adjacent control rod and the opposite corner of the fuel bundle. In addition, removable rods may be located symmetrically on each side of the line or diagonal. Depending upon the effect desired, each of the removable rods is filled (in its entirety or partially) with a special material which may include any of the following: (1) fuel material with an enrichment equal to or different from the rest of the rods, (2) fuel material mixed with a special neutron absorber, (3) inert or diluent material (such as alumina, zirconia, etc.) mixed with a special neutron absorber, (4) a special neutron absorber material without additives.

---

The present invention relates broadly to an improvement in nuclear fission reactors and more particularly to a unique fuel bundle for use with such nuclear fission reactors.

The release of large amounts of energy through nuclear fission reactions is now quite well known. In general, a fissile (fissionable) atom such as $U^{233}$, $U^{235}$, $Pu^{239}$, or $Pu^{241}$ absorbs a neutron in its nucleus and undergoes a nuclear disintegration. This produces on the average two fission products of lower atomic weight with great kinetic energy, and several neutrons also of high energy. For example, the fission of $U^{235}$ produces a light fission product and a heavy fission product with atomic mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissile material exists in the fuel to override the effects of the fission products and other neutron absorbers such as fission regulating control rods which also may be present.

In order to maintain such fission reactions at a rate sufficient to generate useful quantities of thermal energy, nuclear reactors are presently being designed, constructed, and operated in which the fissile material (nuclear fuel) is contained in the fuel elements which may have various shapes, such as plates, tubes or rods. For convenience these fuel elements will hereinafter be referred to as fuel rods. These fuel rods are usually provided on their external surfaces with a corrosion-resistant non-reactive cladding which contains no fissile or fertile material. The fuel rods are grouped together at fixed distances from each other in a coolant flow channel or region as a fuel bundle, and a sufficient number of these fuel bundles are combined to form the nuclear reactor core capable of the self-sustained fission reaction referred to above. The core is usually enclosed within a reactor vessel.

In general, nuclear reactor power plants are designed for periodic shut down to refuel the reactor core. This is referred to as "reloading" the reactor and is performed by replacing part or all of the irradiated fuel with unused reload fuel. Typically, the reload schedule is arranged for reactor shutdown during those periods when power demands on the overall power grid are at a minimum. The scheduled reload may typically require that 20 to 25% of the irradiated fuel be removed from the reactor core and replaced with reload fuel. Therefore, for 25% annual reloads, there will be four reload shutdowns resulting in a complete replacement of the original fuel at the end of four years of normal operation.

The nuclear design of the reload fuel is fixed many months (12 months is not unusual) before loading the reload fuel into the reactor. The major portion of this lead time is required for nuclear design, manufacturing, testing and delivery of the reload fuel. It is very important to note that the nuclear design of the reload fuel is based on the condition of reactor that is predicted to exist at the date of the scheduled reload. The basic conditions which must be considered in designing the reload fuel are: (1) the reactivity condition of the reactor core and remaining fuel, (2) the design lifetime and reactivity of the reload fuel, (3) the control rod strength (the neutron absorption effectiveness of the control rod), and (4) the desired shutdown margin (the control rod system strength over and above that required to shut down the reactor).

Since the reload fuel is designed many months in advance, there is a substantial likelihood that the nuclear design will not strictly meet the needs of the reactor at the time of reactor shutdown if unexpected deviations from originally predicted conditions occur. Such deviations may result, for example, from operations at power levels above or below that assumed for the period. From an economic operation standpoint, it would be very desirable to change the characteristics of the reload fuel to accommodate these deviations in order that the reload fuel meet the needs of the reactor as closely as possible. Once the reload fuel has been manufactured to a design correct for the assumed reactor conditions, there have been available, prior to the present invention, only very limited and laborious techniques for changing the nuclear characteristics of reload fuel to accommodate the deviations from the assumed conditions so as to meet the needs of the reactor actually encountered at the time of shutdown for refueling. In such situations the time and expense required to alter the reload fuel bundles may be such as to require the use of the unmodified reload fuel under inefficient conditions. It may also require the unplanned exchange of control rods to increase or decrease their reactivity worth, or it may require the rearranging of fuel bundles in the core, or both. These situations can often require excessive expenditures of money, extended shutdown of the reactor power plant or other inconveniences which are detrimental to the economic and efficient operation of a nuclear reactor power plant.

The object of the present invention is to overcome these problems by providing a fuel bundle, the nuclear characteristics of which may be readily and economically altered within relatively wide limits at the reactor site to accommodate the deviations from those reactor characteristics which were assumed would exist some months earlier and upon which the reload fuel design was based.

Briefly, the present invention comprises a basic fuel bundle having a plurality of fuel rods, including one or more easily removable special neutron absorber rods (hereinafter referred to as removable rods) positioned in one or more locations in the fuel bundle substantially along a line of rod positions which intersects the longitudinal axis of the fuel bundle and the extension of which intersects the longitudinal axis of an adjacent control rod. In a square fuel bundle this line is represented by a diagonal line that intersects the corner of the fuel bundle nearest the longitudinal axis of an adjacent control rod and the opposite corner of the fuel bundle. For convenience this line of rod positions will be referred to as a diagonal in the context of square arrays. In addition, removable rods may be located symmetrically on each side of the line or diagonal. Depending upon the effect desired, each of the removable rods is filled (in its entirety or partially) with a special material which may include any of the following: (1) fuel material with an enrichment equal to or different from the rest of the rods, (2) fuel material mixed with a special neutron absorber, (3) inert or diluent material (such as alumina, zirconia, etc.) mixed with a special absorber, (4) a special neutron absorber material without additives.

It has been found that by proper placement of removable rods in the regions specified above that the strength of the adjacent control rod can be adjusted, or the reactivity of the fuel bundle can be adjusted, or both. For example, the strength of the adjacent control rod may be increased, as compared to its strength if the unmodified reload bundle had been used, by placing a removable rod filled with special neutron absorber on the diagonal in the corner opposite the control rod. This has the effect of "tilting" the neutron flux pattern about the center of the fuel bundle, that is, lowering it adjacent the removable rod and raising it adjacent the control rod. Also, the control rod strength may be decreased by placing this absorber-containing removable rod on the diagonal in the corner adjacent the control rod. It has also been found possible to increase the overall reactivity of the fuel bundle and not substantially effect the adjacent control rod strength by appropriate positioning of removable rods containing enriched fuel material. Moreover, it is possible to decrease the overall reactivity of the fuel bundle and not substantially effect the adjacent control rod strength by appropriate positioning of removable rods containing either a neutron absorber or a lower enriched fuel than that replaced. An appropriately positioned absorber-containing removable rod may be also added to eliminate completely any difference in effect on the adjacent control rod strength. In addition, the reactivity lifetime characteristics of the fuel bundle may be varied by changing the atomic density (i.e. atoms/unit volume) in the absorber-containing removable rod. Further, the neutron absorption capability of the absorber-containing removable rod may be varied by changing the effective diameter of the absorber within the removable rod while maintaining the exterior diameter of the removable rod uniform.

It should be noted that in certain situations it may be desirable to replace the removable rods of some or all irradiated fuel bundles where thes bundles are not yet scheduled for replacement with reload fuel. This could happen, for example, if the scheduled shutdown for the power plant was postponed and operation of the reactor was therefore extended. Under these conditions, the reload fuel bundles (manufactured many months in advance) may not have sufficient reactivity to drive the reactor core at normal operating power levels for the required period of time. If in addition to loading the reload fuel bundles, the reactivity of some of the irradiated fuel bundles could also be increased, their life and that of the core could be extended. In many instances, sufficient increase in reactivity may be achieved by replacing some or all of the removable rods of some or all of the irradiated fuel bundles with removable rods containing enriched fuel material to accomplish the necessary extension of life. The present invention is particularly well suited for this purpose since a wide variety of enriched removable rods are available and they may be inserted into the fuel bundles while the fuel bundles remain in the reactor core. The ability to replace removable rods quickly while the fuel bundles are in the reactor core is particularly important. If this quick replacement was not possible, the expense and delay would be generally so great as to require the replacement of some of the fuel bundles with additional reload fuel. This results in a substantial increase in cost of operation due to the removal and non-utilization of fuel bundles that still have power producing capability.

In actual practice, a central source of removable rod inventory may be maintained which includes removable rods of discrete nuclear absorber concentrations, discrete absorber radii, and discrete enrichments of fissile material. In this manner, it is possible to make available immediately to a reactor power plant that has been or is about to be shut down that combination of removable rods necessary for insertion into the irradiated and/or reload bundles.

It should be noted that the heretofore described removable rod fuel bundle concept of the present invention may be used with various square array fuel bundle types, for example, square arrays having fuel rods arranged in 5 x 5, 6 x 6, 7 x 7, 8 x 8 patterns, etc. In addition, the removable rod fuel bundle concept of the present invention may be used with fuel bundles having other than square arrays, such as hexagonal rectangular, or the like.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

FIGURE 4 is an isometric view in partial cross section of another embodiment of the fuel bundle of the present invention;

FIGURE 5 is a top view of the upper tie plate of the fuel bundle of FIGURE 4;

FIGURE 6 is an enlarged isometric view of the removable rod openings of the upper tie plate shown in FIGURE 5;

FIGURE 7 is a view taken at section 7—7 of FIGURE 6;

FIGURE 8 is a side elevation of one embodiment of a removable rod which is suitable for use with the fuel bundle of FIGURES 4 and 5;

FIGURE 9 is an end view of the removable rod of FIGURE 8;

Figure 1:
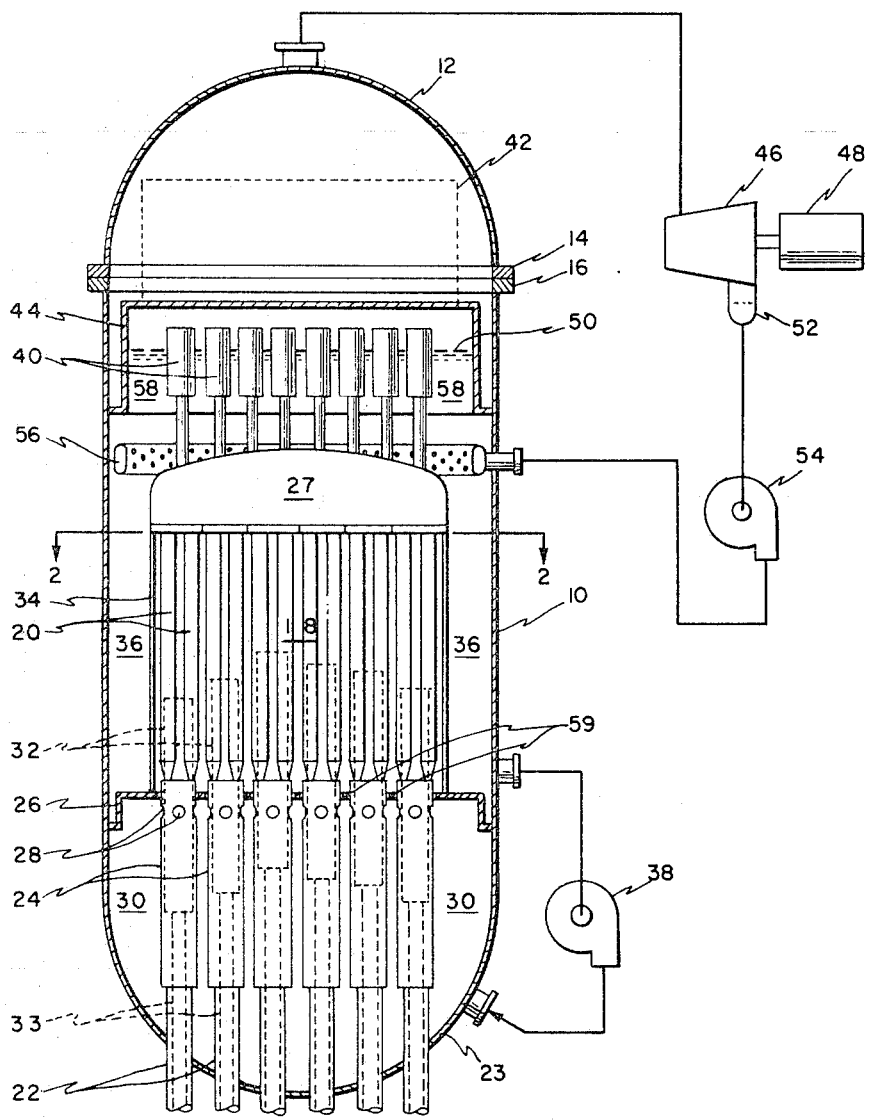
FIGURE 1 is a schematic flow diagram of a typical nuclear reactor power plant showing the reactor vessel in partial cross section and in which the fuel bundle of the present invention may be employed.

In FIGURE 1 is schematically illustrated a typical nuclear reactor power plant flow diagram in which the fuel bundle of the present invention may be employed. It is to be understood that the teachings of the present invention may be used with many different types of nuclear reactor power plants such as non-boiling water types, the heavy water and graphite moderated, organic moderated, or types that employ sodium or other fluids as moderator-coolants. However, it is described as used with a boiling water reactor since it has been found porticularly useful with this type plant.

The reactor system depicted in FIGURE 1 includes reactor pressure vessel 10 provided with removable head 12 which is secured by means of flanges 14 and 16. Disposed within pressure vessel 10 is a nuclear chain reacting core 18 which includes a plurality of vertically positioned nuclear fuel bundles 20. Each fuel bundle consists of a plurality of longitudinally extending fuel rods which are positioned in spaced relation by means of top and bottom fittings which have openings to permit coolant flow. Each bundle is provided with an open ended flow channel that surrounds the fuel rods.

A plurality of control rod drive thimbles 22 extend through and are sealed and connected to bottom head 23 of the reactor vessel by welding or the like. A plurality of longitudinally extending control rod guide tubes 24 have their lower ends secured to and are vertically and laterally supported by the upper ends of drive thimbles 22. The upper ends of control rod guide tubes 24 are laterally supported by bottom grid plate 26. The upper end of each control rod guide tube is provided with four sockets (not shown) and a cruciform-shaped opening (not shown). Four fuel bundles 20 are supported by each control rod guide tube 24, the bottom fitting of each bundle being mounted in one of the four sockets. Each control rod guide tube is provided with openings 28, located near the upper end, that communicate with supply chamber 30 and with the sockets and the bottom fittings of the associated fuel bundles.

Control rods 32 (shown in dotted lines) control the overall power level, as well as the local power distribution of the reactor. A cruciform-shaped control rod is located in each control rod guide tube and is adapted to be moved vertically between the four associated fuel bundles 20 resting on the guide tube. The control rods are moved into and out of the reactor core by control rod drive shafts 33 (shown in dotted lines) which extend into respective control rod drive thimbles 22. The control rod drive shafts are selectively operated by individual drive mechanisms (not shown) which control the positions of the control rods in the reactor core. Detailed descriptions of drive mechanisms which may be used to drive the above described control rods are set forth in United States Patent 3,020,887, by Robert R. Hobson, et al., issued Feb. 13, 1962.

A shroud 34 is mounted coaxially within the vessel to provide a downcomer annulus 36 between the shroud and the vessel wall. Recirculation water is continuously removed from the bottom of downcomer annulus 36 by pump 38 and introduced to supply chamber 30.

In the operation of a typical boiling water reactor a steam-water mixture generated in core 18, is discharged into plenum 27 from which the mixture flows upward into steam separators 40. Here the steam is separated from most of the water. The separated steam flows upward to steam dryer 42, mounted on annular support member 44, which removes the remaining water. The dry steam leaving the dryer is then transmitted to turbine 46 which drives electric generator 48. Water discharged from separators 40 and dryer 42 flows downwardly and radially outward across the top of plenum 27 and between the separators toward downcomer annulus 36. Broken line 50 illustrates the water level.

Exhaust steam from turbine 46 is condensed and collected in the condenser hotwell 52. Steam condensate is removed from the hotwell by pump 54, and is pumped as feedwater to annular sparger 56 thus mixing the feedwater with the water flowing from separators 40 and steam dryers 42. Recirculation pump 38 transfers recirculation water from the lower end of downcomer annulus 36 and returns it to supply chamber 30 at an increased pressure. Because of this pressure increase, the recirculation water flow is upward from supply chamber 30 successively through fuel bundles 20, plenum 27, steam separators 40, upper chamber 58, downcomer 36, and back into the inlet of the recirculation pump 38. It will be appreciated that recirculation pumping may be also performed by jet pumps placed in downcomer 36.

In actual practice, the water flowing from supply chamber 26 is divided into two parallel streams. The first stream, consisting of about 90% of the total flow from supply chamber 30, passes successively through openings 28 at the top of the control rod guide tubes 24, the lower fittings of the fuel bundles, into and through the flow channels of the fuel bundles, through the upper fittings of the fuel bundles, and into plenum 27. Within the flow channels, the water stream serves as a moderator-coolant for the fuel rods and in the process is partially vaporized to form a steam-water mixture.

The second stream, commonly referred to as the bypass leakage flow and consisting of the remaining 10% of the water flow from supply chamber 30, passes through annular openings 59 formed between the exterior surfaces at the upper ends of control rod guide tubes 24 and the associated openings in bottom grid plate 26. This water flows upward through the spaces formed between the outside of the nuclear fuel bundle flow channels and the control rods 32 and discharges into plenum 27 through spaces formed between the upper ends of the fuel bundle channels. This water serves to cool the control rods and fuel bundle channels to prevent the formation of steam in this region. This water also contributes to the neutron moderator effect of water flowing within the flow channels and has a substantial effect on reactor operation as will hereinafter become apparent. The quality of the steam-water mixture resulting from combining the first and second streams in plenum 27 is typical about 10%.

Figure 2:
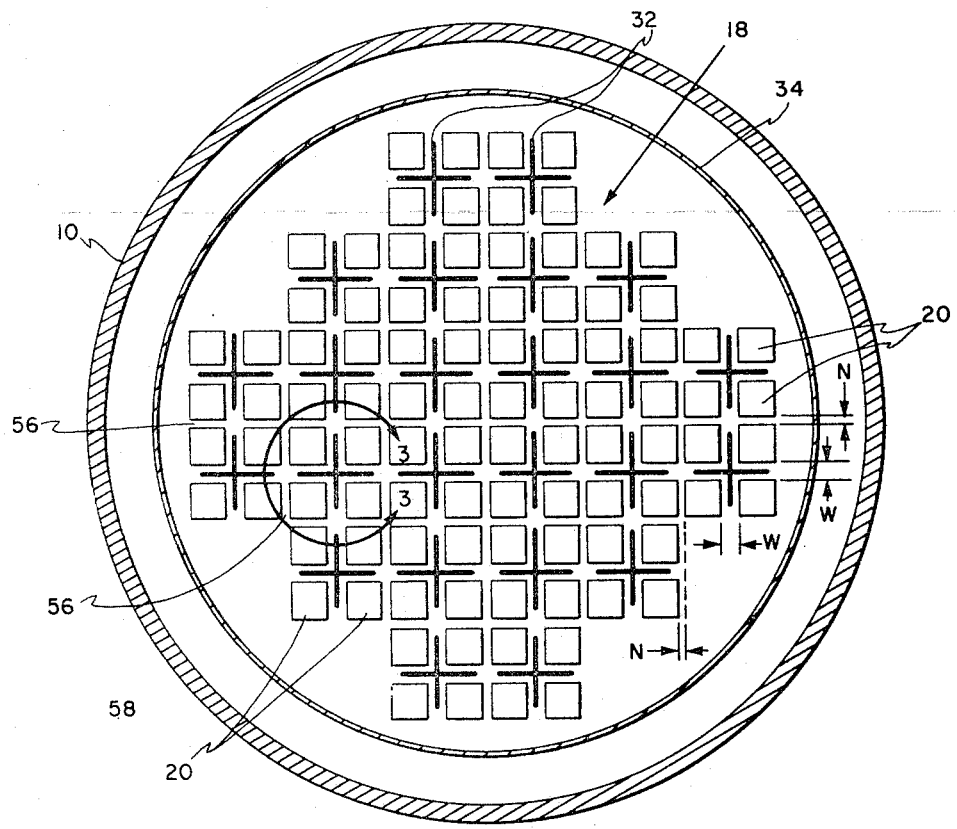
FIGURE 2 is a horizontal cross section view of the reactor vessel and core taken at section 2—2 of FIGURE 1.

In FIGURE 2 is a cross section view of reactor pressure vessel 10 taken through the core at the level 2—2 shown in FIGURE 1. Reactor vessel 10 is shown surrounding core 18 and shroud 34. The fuel bundles 20 are grouped together in groups of four with relatively narrow spaces (N) between them to facilitate fuel bundle insertion and removal and to provide areas for instrumentation. Considerably wider spaces (W) are formed between the fuel bundles of each group to receive cruciform-shaped control rods 32 which are reciprocably positioned therebetween. Thus, two sides of each fuel bundle have adjacent control rod blade surfaces and two sides do not. Spaces (N) and (W) between the fuel form the space through which the core bypass leakage flows (the second water stream) and thus are filled with water.

Figure 3:
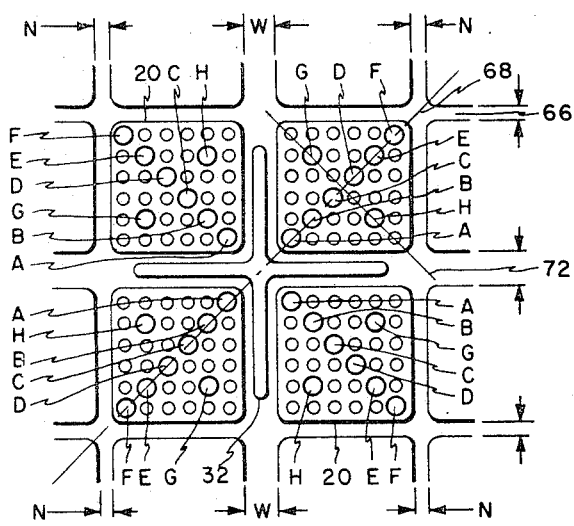
FIGURE 3 is an enlarged view of the top of the fuel bundle taken at section 3—3 of FIGURE 2 and illustrates one embodiment of the removable rod fuel bundle of the present invention.

FIGURE 3 is an enlarged portion of the top elevation view of FIGURE 2 taken at Section 3—3. This figure more clearly shows the cruciform shape of a typical control rod 32 and generally shows the removable rod locations of one embodiment of the present invention. The embodiment of the fuel bundle shown in FIGURE 3 consists of a 6 x 6 array of fuel rods arranged in a square pitch and having eight removable fuel rod locations. It should be particularly noted that six of the removable rod locations (A, B, C, D, E and F) lie along diagonal 68, which intersects the longitudinal axes of control rod 32 and of fuel bundle 20 and thus extends from the adjacent corner of the fuel bundle to the opposite corner of the fuel bundle, and that other removable rod locations (G and H) are symetrically positioned on opposite sides of diagonal 68 and, in this embodiment, along diagonal 72. The reasons for this arrangement and other alternative arrangements and embodiments are considered in detail below.

In FIGURE 4 is illustrated another embodiment of the fuel bundle of the present invention. As distinguished from the embodiment shown in FIGURE 3 this embodiment incorporates only six removable rod openings. Fuel bundle 20' generally consists of open ended tubular channel 74, fuel rods 76, lower tie plate 78, upper tie plate 80, and fuel element spacer devices 82. Fuel rods 76 (including the removable rods 76' inserted through removable rod openings B, C, D, E, G and H) extend through and are supported in spaced relation by a plurality of fuel element spacer devices 82 which rest against the interior surface of tubular channel 74. These fuel rod spacer devices are separated from one another a predetermined distance along the bundle, for example, one and one-half feet, and are connected to one or more of the fuel rods to prevent longitudinal movement. This connection may be achieved by various means such as the attachment of locking devices to the fuel rod at these same predetermined distances.

Each fuel rod 76 comprises an elongated tube containing a fissile fuel material such as enriched uranium dioxide ($UO_2$). In the case of the removable rods the tubes may be filled with a special material which may include any of the following: (1) fuel material having the same or a different enrichment than the other fuel rods in the bundle, (2) enriched fuel material mixed with a special neutron absorber, (3) inert or diluent material (such as alumina, zirconia, etc.) mixed with a special neutron absorber, (4) a special neutron absorber material without additives, depending on the effect to be achieved. The fuel material is typically in the form of high density pellets placed end to end in the tube; however, it may be in the form of a compacted mass of high density powder or particles. Each end of the tube is sealed to prevent the coolant from contacting the fuel and to prevent fission products form escaping the fuel rod.

The lower ends of the fuel rods are supported by lower tie plate 78 and register with receptacles 84 which are formed part way through the tie plate. Openings 86 are positioned adjacent these receptacles and communicate directly with lower opening 88. The lower end of tubular channel 74 fits down around the upper end of the tie plate. The lower end of the tie plate is a tapered transition fixture terminating in an open nose-piece 89 of circular cross section and, when mounted in the reactor, rests on and in one of the sockets located at the top of a control rod guide tube 24 of FIGURE 1. When the fuel bundle is mounted in the reactor, lower opening 88 communicates with supply chamber 30 of FIGURE 1.

Several fuel rods, such as those denoted by reference numeral 90, are positioned in the corners and have threaded extensions which extend through upper tie plate 80 and are secured to the plate by means of nuts 92. Fuel rod support receptacles 94 are formed through the upper tie plate and receive the upper ends of the fuel rods. Compression springs 98 are provided to maintain a load, which is determined by the torque applied to nuts 92, between upper tie plate 80 and the upper shoulder of fuel elements 76. Openings 96 are provided in upper tie plate 80, between receptacles 94 receiving the fuel rods ends, to communicate the interior of the fuel bundle with the discharge plenum of the reactor. Upper tie plate 80 is also provided with two handles 100 which are used to raise and lower fuel bundle 20 in the reactor core. The handles may be made separate from or integral with the tie plate and are positioned in parallel relation and along opposite edges of the tie plate. By using two spaced parallel handles in this manner minimum interference with access to removable fuel rods at the desired positions in the fuel bundle is achieved. These handles may also be provided with interconnecting support members 102 to provide added strength and rigidity.

In FIGURE 5 is illustrated an enlarged top view of upper tie plate 80 of FIGURE 4. The tie plate includes six removable openings B, C, D, E, H and G, the details of which are shown in the isometric view of FIGURE 6 and the FIGURE 7 section view taken at 7—7 of FIGURE 6. Each of the removable rod openings is formed by an elongated cylindrical member 103 which includes slot 104 that extends the entire length of cylindrical member 103 (as well as the thickness of the tie plate) and notch 106 which is disposed 180° opposite from slot 104 and extends upward a short distance from the bottom of member 103. The slot and notch of each removable rod opening cooperate with the removable rod shown in FIGURE 8.

Referring to FIGURE 8, removable rod 76' includes an elongated cylindrical region 110 which contains the nuclear material referred to above. The bottom end of the fuel region is closed by bottom nose plug 112. The bottom nose plug includes bullet-shaped nose region 114 for insertion into fuel rod receptacle 84 of the lower tie plate, a cylindrical region 116 which has a close radial fit with receptacle 84, and conical region 118 which rests against the upper surface of the tie plate adjacent the receptacle.

The upper end of fuel region 110 of fuel rod 76' is closed by upper end plug 120 which tapers upward and has a longitudinally extending cylindrical shank 122 provided with collar 129 connected at its upper end. Cylindrical locking sleeve 124 surrounds and is slideably and rotatably mounted on shank 122. The lower end of locking sleeve 124 is provided with pin 126 which extends radially outward from the lower end of the sleeve. The upper end of the sleeve is provided with nut 128 and a circumferential groove 130. Compression spring 132 is provided around shank 122 between the lower end of locking sleeve 124 and the tapered section of end plug 120 to force locking sleeve 124 upward against collar 129. The locking mechanism 135 of the removable rod shown in FIGURE 8 includes nut 128, circumferential groove 130, locking sleeve 124, pin 126, and compression spring 132 the function of which will be described below. A slot 136 is formed at the end of shank 122 to provide a means for rotating the fuel rod.

Positioning a removable fuel rod 76' in the fuel bundle of this invention is accomplished by sequentially (1) inserting the removable rod into one of openings B, C, D, E, G or H shown in FIGURES 4 through 7, (2) rotating locking mechanism 135 so that pin 126 coincide with slot 104, (3) forcing the locking mechanism downward against compression spring 132 so that pin 104 passes downward completely through slot 104, (4) rotating sleeve 124 180° until pin 126 coincides with notch 106, and (5) releasing the locking mechanism so that spring 132 forces pin 104 upward into engagement with notch 106. The pin remains in locked engagement with notch 106 since compression spring 132 maintains this force against the locking mechanism in the upward direction. Removal of the removable rod involves the reverse sequence of steps just stated. The locking mechanism may be gripped and rotated by appropriate tooling adapted to engage nut 128. Groove 130 is provided so that appropriate tooling may be inserted into engagement with the grooove to provide a positive lock between the tool and the removable rod such that the removable rod may be positively gripped for lifting and turning. It is to be understood that notch 106 may be offset from slot 104 by any convenient angle.

The embodiment shown in FIGURES 4 and 5 have only four removable rod locations along the diagonal. This is because handles 100 cover corner openings A and F (see FIGURE 4) and removable rods could therefore not be used in these corners. Alternative handle designs could be provided that would permit access of these openings thereby permitting removable rod openings at all positions, A, B, C, D, E, F, G and H, as shown in the FIGURE 3 embodiment.

The fuel bundle of the present invention makes it possible to adjust important nuclear characteristics of the fuel bundle to meet a wide range of requirements of the reactor through insertion of any one of a variety of removable rods as previously described. The following physics explanation is provided to enable a better appreciation and understanding of the manner in which the removable rods of the present invention may be applied for use with fuel bundles of the present invention.

The fixed control system strength (fuel bundles containing neutron absorber removable rods) is referred to as $$\left(\frac{\Delta k}{k_F}\right)$$

and may be given by the expression:

(1) $\qquad \left(\dfrac{\Delta k}{k_F}\right) = \dfrac{\Omega}{1+\Omega}$ where (2)

$$\left(\frac{\Delta k}{k_F}\right) = \frac{k_\infty \text{ (without absorber rod)} - k_\infty \text{ (with absorber rod)}}{k_\infty \text{ (without absorber rod)}}$$

and (3) $\qquad \Omega = \dfrac{\pi \theta}{2}\left\{\dfrac{rG}{\Sigma_a}\right\}$ where $k_\infty$ = neutron multiplication constant in an infinite system
$\theta$ = number of poison rods per unit bundle area (rods/cm.$^2$)
$r$ = time dependent effective absorber radius (cm.)
$G$ = time dependent thermal flux depression factor (nondemensional)—see Equation 5
$\Sigma_a$ = cell averaged thermal absorption cross section of fuel without absorber rod (cm.$^{-1}$)

As a first approximation the absorber radius may be related to the fuel exposure by the linear expression:

(4) $\qquad r = r_0(1 - E/E_B)$ where $r_0$ = initial absorber radium (cm.)
$E$ = exposure ($MWD/T$)
$E_B$ = exposure at which absorber effect is to be depleted ($MWD/T$)

The flux depression factor ($G$) is dependent on absorber radius, fuel diffusion coefficient, and thermal diffusion length. To a first approximation the variation of ($G$) is dependent only on absorber radius and may be taken as:

(5) $\qquad G = \dfrac{1+br}{1+ar}$ where $r$ is the absorber radius (cm.) and the constants ($a$) and ($b$) are dependent on the reactor condition and for a typical boiling water reactor, $a$ = 4.1, 3.1 and 3.2 and, $b$ = 2.0, 1.7 and 2.0 for cold, hot standby and hot operating conditions, respectively. These factors will vary in a known manner with different core parameters and in different types of reactors.

Variation of the absorber atom concentration in the absorber rod (absorber atoms per cubic centimeter) results in variation of the fuel bundle exposure required to deplete the control capability of the fixed control system.

The analytic expression relating the approximate initial absorber atom density required to achieve the desired burnup exposure is:

(6) $\qquad \rho = \dfrac{KE_B}{4}\left\{\dfrac{ar_0}{b} + \dfrac{a-b}{b^2}l_n\left(\dfrac{1}{1+br_0}\right)\right\}^{-1}$ where $$K = \frac{1}{\bar{\sigma}_{25}E_B}l_n\left\{\frac{AF_0}{AF_B}\right\}\left(\frac{1}{\text{barn MWD/T}}\right)$$

and $\bar{\sigma}_{25}$ = time average microscopic absorption cross section of U-235 representative of the fuel spectrum (barns)
$E_B$ = approximate or estimated fuel exposure in the region of the core around the reload fuel location, of the desired burn-up exposure ($MWD/T$)
$AF_0$ = initial atom fraction of U-235
$AF_B$ = U-235 atom fraction at exposure $E_B$ The control strength of the movable control rod (located adjacent the fuel bundle) is referred to as $$\left(\frac{\Delta k}{k_M}\right)$$

and may be given by the expression:

(7)

$$\left(\frac{\Delta k}{k_M}\right) = \frac{k_\infty^{uc} \text{ (control rod out)} - k_\infty^c \text{ (control rod in)}}{k_\infty^{uc} \text{ (control rod out)}}$$

where $k_\infty^{uc}$ and $k_\infty^c$ are the neutron multiplication constants in an infinite system when the control rods are respectively fully withdrawn and fully inserted. In both cases ($k_\infty^{uc}$ and $k_\infty^c$) the fixed control system, when used, is considered positioned in the system.

Figure 10:
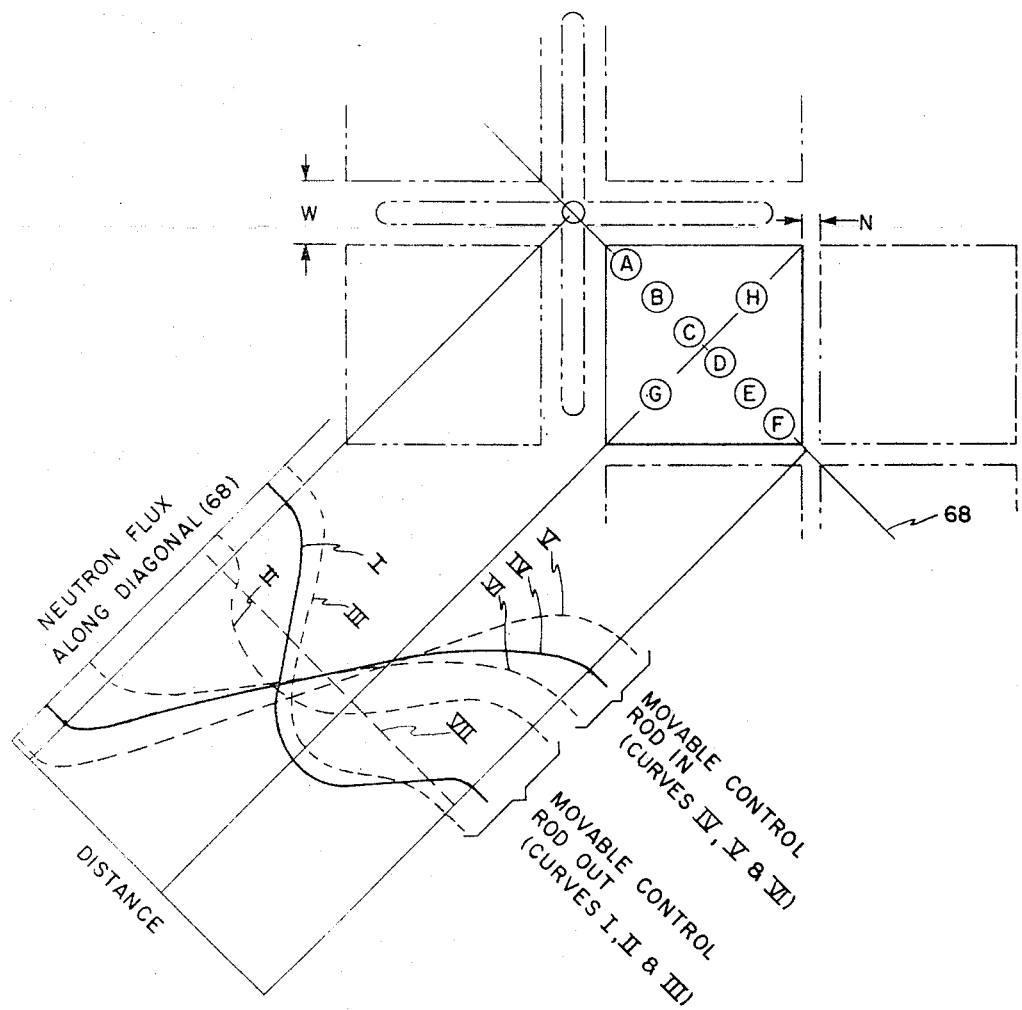
FIGURE 10 is a diagram illustrating the neutron flux variation along the diagonal of the fuel bundle.

The reactivity of the fuel bundle and the control rod strength are influenced by the location of the absorber containing removable rod within the fuel bundle. This is because a given absorber rod will capture more neutrons in regions having a high neutron flux than in regions having a low neutron flux. The higher neutron fluxes generally occur in and near the water-moderator regions due to the greater thermalization in these regions of relatively low neutron absorption. Curve I of FIGURE 10 shows the neutron flux distribution of the fuel bundle along diagonal 68 when no aborber rods are inserted into the bundle. From Curve I it can be seen that the neutron flux is relatively high in the wide (W) and narrow (N) water-moderator regions and is relatively low within the bundle where it passes through a minimum at about the center region. FIGURE 10 also shows several other curves which will be explained below.

Figure 11:
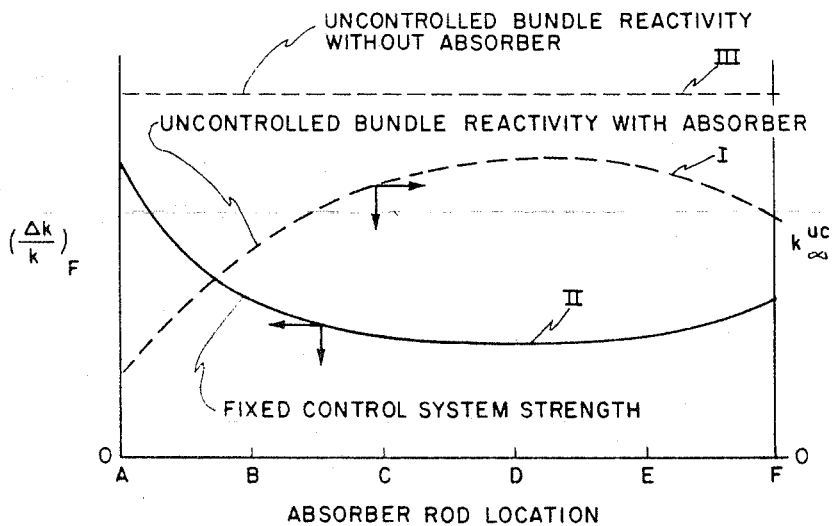
FIGURE 11 is a diagram illustrating the uncontrolled bundle reactivity with (Curve I) and without (Curve III) the movable control rod inserted and the uncontrolled bundle reactivity as a function of absorber rod location in the fuel bundle.

From Curve I of FIGURE 11 it can be seen that the uncontrolled bundle reactivity will be at a minimum when the absorber rod is located at position A (see FIGURE 3) and will progressively increase as that same rod is sequentially transferred to positions B, C and D and will then gradually decrease while moved to positions E and F. Conversely, the fixed control system strength (Curve II) initially decreases and then increases as the absorber rod is sequentially moved to positions A through F. These curves illustrate the effect of a single absorber rod and they can be readily expanded to include a family of curves showing the effect of multiple absorber rods along the diagonal (points A through F) as well as other locations symmetrical with respect to this diagonal such as points G and H.

Figure 12:
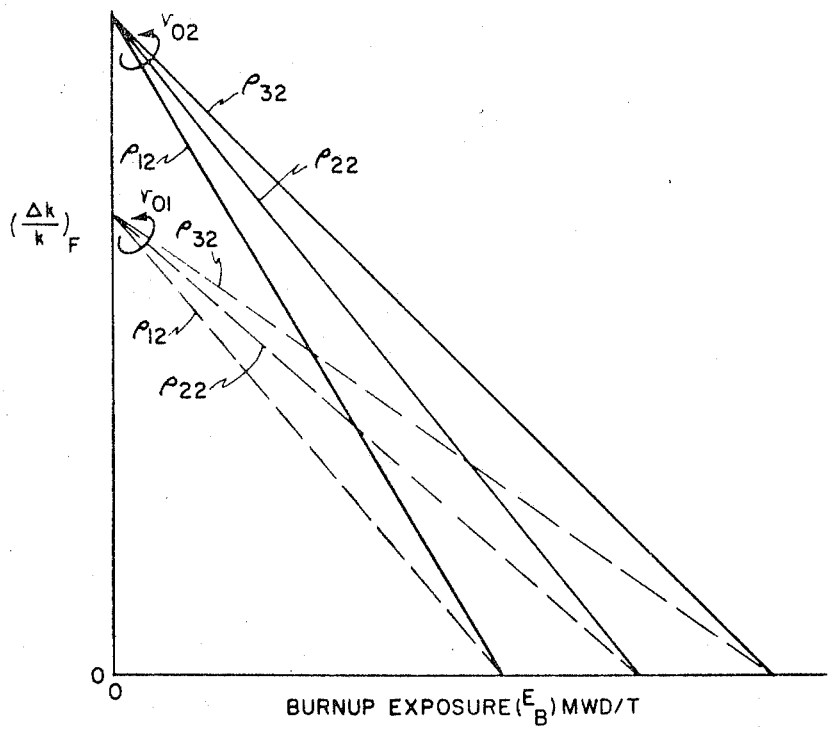
FIGURE 12 is a family of curves illustrating uncontrolled bundle reactivity and burnup exposure as a function of discrete variations in the radius of the absorber material and in the concentration of the absorber material.

FIGURE 12 is a family of curves illustrating the effect of variations of the outer radius of the absorber material and of the concentrations of the absorber material. The family of curves associated with a small absorber radius ($r_{01}$) have a lower fixed control system strength ($\Delta k/k)_F$ than does the family of curves associated with a larger absorber radius ($r_{02}$). In addition, an increase in density of the burnable absorber atoms increases the burnup exposure ($E_B$). This is indicated in FIGURE 12 respectively by the family of curves $\rho_{11}$, $\rho_{21}$, and $\rho_{31}$ (associated with radius $r_{01}$) and $\rho_{12}$, $\rho_{22}$, and $\rho_{32}$ (associated with radius $r_{02}$). From this it can be seen that the strength of the burnable fixed control system may be predetermined by appropriate selection of the effective radius or diameter of the burnable absorber material. Variations in the density of the burnable absorber will provide corresponding variations in the duration of the fixed control effect.

The movable control rod strength $(\Delta k/k)_M$ may also be varied as a function of absorber rod position in the fuel bundle. The positioning of the absorber rod along the diagonal will effect a significant redistribution of the thermal neutron flux across the fuel bundle. Thus, the neutron flux in the region of the control rod may be altered. The strength of a control rod is directly proportional to the neutron flux in the surrounding area.

Figure 13:
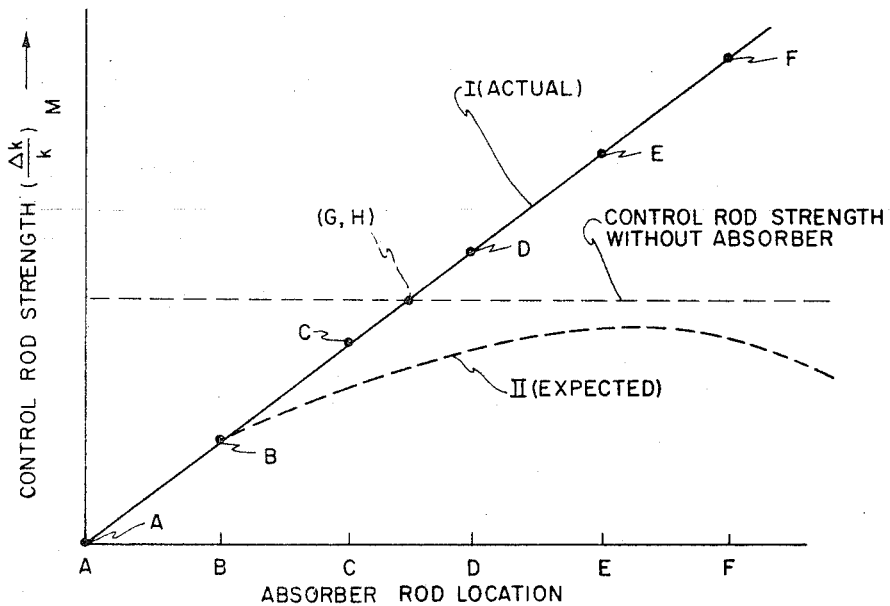
FIGURE 13 is a set of curves illustrating the control rod strength as a function of absorber-containing removable rods positioned along the diagonal fuel bundle of the present invention.

It has been found that the reactivity strength of the control rod adjacent the bundle progressively increases as a given absorber rod is progressively moved from position A to F (see FIGURE 3) as illustrated by Curve I of FIGURE 13. This was not originally anticipated since Curve I of FIGURE 11 shows that the bundle reactivity $(k_\infty^{uc})$ progressively increases and then decreases as the absorber rod is moved along the diagonal. Therefore, it was expected that this same general curve would characterize the control rod strength as indicated by Curve II of FIGURE 13. The continuous increase of Curve I of FIGURE 13, rather than the initial increase and then decrease of Curve II of FIGURE 13, is believed to be due to a "tilting" effect of the neutron flux in the fuel bundle about the center of the diagonal as the absorber rod is moved to points D, E and F. This tilting effect is illustrated by the two families of curves shown in FIGURE 10. The first family of curves (Curves I, II and III) represents the neutron flux distribution when the movable control rod is fully withdrawn. The second family of curves (Curves IV, V and VI) represents the neutron flux distribution when the movable control rod is fully inserted. Curve VII represents the neutron flux level about which Curves I through VI are normalized.

Referring to the first family of curves, Curve I represents the flux distribtuion across the bundle (along diagonal 68) when no absorber rods are inserted into the bundle and the control rod is out. Curve II represents the flux distribution (control rod out) when a single absorber rod is located at position A and Curve III represents the flux distribution (control rod out) when a single absorber rod is located at position F. For clarity, the complete family of curves is not shown (i.e., absorber rod in positions B, C, D, E, G and H); however, it will be appreciated that they will be proportionally positioned between Curves II and III. For example, an absorber rod located at position B would cause a neutron flux distribution which would be represented by a curve between Curves I and II and an absorber rod located at position E would be represented by a curve between Curves I and III. From Curve II (absorber rod at A) it can be seen that the neutron flux in the region of the control rod is substantially decreased thus reducing the control rod strength. Conversely, as illustrated by Curve III, it has been found that the control rod strength is increased by locating the absorber rod at position F. This is because the neutron flux distribution apparently "tilts" about the center of the fuel bundle as shown by this family of curves.

Referring to the second family of curves (Curves IV, V and VI) it can be seen that the flux distribution when the movable control rod is in is much lower adjacent the control rod than when the control rod is out. The variation in this family of curves as a function of the variation in the location of the removable absorber rod is similar to that of the first family of curves. It will also be apparent that other curves can be drawn illustrating the flux distribution when more than one absorber rod are inserted into the fuel bundle. With absorber rods located in positions D, E, F, the resultant neutron flux in the region adjacent the control rod is greater than would be normally expected. It has therefore been found possible to increase the control rod strength by the use of absorber rods located in these positions.

From the foregoing it can be seen that the fuel bundle has the capability of modifying nuclear characteristics of the reactor core in a plurality of different ways. The basic changes to the reactor characteristics which can be made by the fuel bundle are as follows:

(1) Reduce the uncontrolled infinite neutron multiplication $(k_\infty^{uc})$
(2) Increase the movable control system strength $(\Delta k/k)_M$
(3) Decrease the movable control system strength $(\Delta k/k)_M$
(4) Decrease the movable control system strength $(k_\infty^{uc})$
(5) Vary the reactor cycle length.

The following examples describe the various situations which may require the use of one or more of the above described features of the fuel bundle of this invention.

EXAMPLE 1

*Reduce the uncontrolled infinite neutron multiplication* $(k_\infty^{uc})$

Figure 14A:
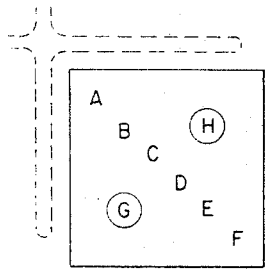
FIGURES 14 through 17 illustrate the locations of removable rods which corresponds to Examples 1 through 4, respectively.
Figure 14B:
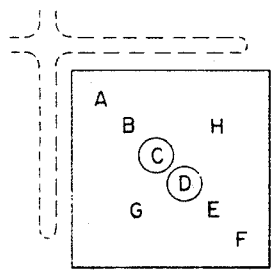

In certain situations it may be desirable to reduce the $(k_\infty^{uc})$ of reload fuel. This may occur, for example, when it becomes necessary to shut down the reactor power plant before it is scheduled for shutdown. There are many different circumstances which may require this premature shutdown, such as turbine or generator failure. As a result of the premature shutdown, the irradiated fuel will not have accumulated sufficient exposure to permit effective use of the reload fuel which was designed many mouths in advance of the scheduled reload. That is, the reactivity $(k_\infty^{uc})$ of the exposed fuel in the core would not have been depleted or decreased sufficiently to accommodate the reload fuel, the enrichment and reactivity of which has been selected on the basis of an assumed lower reactivity core. As a result, the shutdown margin of the reactor could not be met after the addition of the reload fuel since the uncontrolled infinite neutron multiplication factor $(k_x^{uc})$ of the refueled core would be too great. To modify the reload fuel to meet this situation two burnable absorber fuel rods may be inserted into either positions G and H as illustrated in FIGURE 14A or inserted into positions C or D as illustrated in FIGURE 14B. From FIGURE 13 it can be seen that the resulting reduction in $(k_\infty^{uc})$ can be achieved with little effect on the movable control rod system strength. That is, the addition of burnable absorber at points G and H has approximately the same effect of adding burnable absorber at point (G, H) along Curve I of FIGURE 13 and will therefore not appreciably vary the movable control rod strength as a result of the neutron flux tilting action described in connection with FIGURE 13. The addition of absorber rods at points C and D tend to cancel the tilting effect which would otherwise result if only one absorber rod were placed at either C or D. From Curves I and III of FIGURE 11 it can be seen that the bundle reactivity $(k_x^{uc})$ will decrease somewhat by the addition of these absorber rods (C and D or G and H) and there may be a small decrease in the movable control rod strength as well. It should also be noted that this decrease in the control rod strength could be eliminated by the addition of an absorber rod (having an appropriately selected radius) at point E and thereby achieve the original control rod strength. That is, the bundle would have a lower reactivity but the tilting action of the absorber rod at point E would bring about the original control rod strength. It should also be noted at this point that a substantial reduction in the $k_\infty^{uc}$ of the system can be used to decrease the strength the individual control rod which will hereinafter be discussed with respect to Example 3. Depending on the desired result, it is to be understood that only one absorber rod may be used at one of the above mentioned positions.

EXAMPLE 2

*Increase the movable control system strength* $(\Delta k/k)_M$

Figure 15:
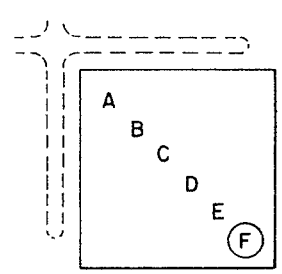

If there is an exceptionally early shutdown which leaves the core with a large excessive reactivity margin over and above that assumed for the core at the proposed shutdown date and there is no difficulty encountered in excessive individual control rod strength, it may be desirable to reduce the $k_x^{uc}$ of the fuel and simultaneously to increase the control rod strength. This may be achieved by positioning the absorber rod at position F as illustrated in FIGURE 15. From Curve I of FIGURE 13 it can be seen that the control rod strength is substantially increased, and from Curve I of FIGURE 11 it can be seen that the fuel bundle reactivity has been decreased. From the previous discussion, with respect to FIGURE 10, it will be appreciated that one or more absorber rods may be located at positions D, E and F depending upon the desired degree of increase of the control rod strength or decrease in $k_\infty^{uc}$ of the fuel. However, care must be taken in making this modification to assure that adequate shutdown margin is maintained as fuel cycle exposure progresses. It is conceivable that the early depletion of the burnable absorber in the removable rod could lead to a fuel bundle or core having excessive reactivity and the shutdown margin could not be maintained.

EXAMPLE 3

*Decrease the movable control system strength* $(\Delta k/k)_M$

Figure 16:
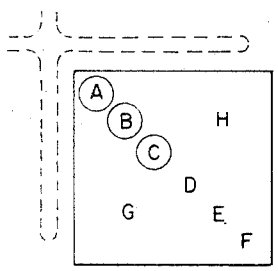

In order to provide smoother radial power distributions and to provide more accurate in-core neutron flux instrumentation response it may be desirable to reduce the overall movable control system strength of the reactor. In addition, it may be desirable to reduce the control rod strength in a localized area in the core. The overall (movable control system) and localized (movable control rod) strength reductions are easily accomplished by the fuel bundle of this invention. This may be achieved by positioning one or more absorber rods at positions A, B or C of FIGURE 3. If, for example, the absorber rods are located at positions A, B and C, as indicated in FIGURE 16, it can be seen from Curve I of FIGURE 11 that the overall $k_\infty^{uc}$ of the fuel is reduced, and from Curve I of FIGURE 13 it can be seen that the control rod strength is also reduced. The degree of reduction in the control system strength is determined by the number of bundles in which absorber rods are positioned and by the number and position of the absorber rods in each bundle. The localized control rod strength is determined by the number and position of absorber rods in that particular bundle.

In the example given in FIGURE 16, absorber rods are located at positions A, B, and C. For a given fixed control system strength this will provide maximum reduction in movable control rod strength as well as in total movable control system strength. This can be seen from Curve I of FIGURE 13 which shows that absorber rods positioned at points C, B and A result in progressively greater reductions in movable control rod strength. The total reduction in movable control rod strength is less than the sum of the three reductions due to the absorber rods at positions A, B and C. However, the total reduction will be greater than any one of the rods individually. If a smaller reduction in movable control rod strength is required, a smaller number of absorber rods may be inserted such as at positions A, B or C or any combination thereof. If a greater reduction in control rod strength is required, the absorber radius of the absorber rods may be increased.

EXAMPLE 4

*Increase the uncontrolled infinite neutron multiplication* $(k_\infty^{uc})$

Figure 17:
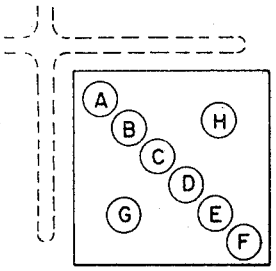

Under certain circumstances it may be desirable to increase the $(k_\infty^{uc})$ of the exposed fuel that is loaded in the core. This could happen if the scheduled shutdown for the nuclear reactor power station must be postponed and operation extended due to an unscheduled shutdown of another plant on the grid. Under these conditions the reload fuel bundles (manufactured many months in advance) will not have sufficient reactivity to drive the core at normal operating power levels until the next scheduled shutdown. It may not be feasible at that time to discharge a larger fraction of the partially exposed fuel and replace it with new reload fuel. In this situation removable rods having a larger reactivity (that is, less absorber or a higher enrichment, or both) can be inserted into one or more of positions A, B, C, D, E, F, G or H, as indicated in FIGURES 3 and 17. Appropriate adjustment of reactivity by the addition of an absorber rod, say at position B, may be made to return original control rod worth. This may be necessary, for example, to maintain proper shutdown margin. In addition, the irradiated fuel which was not replaced by the reload fuel could have its reactivity increased by the addition of enriched removable fuel rods at one or more of positions A, B, C, D, E, F, G, or H.

EXAMPLE 5

*Vary the reactor cycle length*

Because of operating schedule changes the reactor operator may wish to shorten or lengthen the fuel cycle time between refueling shutdowns. These changes in refueling shutdown schedule could be due to unexpected capacity factor changes causing shutdown at undesirable times of the year. Such a change in the fuel cycle could require an increase or decrease in the number of fuel bundles loaded in the reactor. If the cycle is to be increased, the $k_\infty^{uc}$ of a new more reactive fuel must be reduced as in Example 1 to meet shutdown requirements. In addition, for either increasing or decreasing the number of reload bundles the absorber atom density of the removable rod must be altered to be compatible with cycle length. Either the absorber must not deplete too rapidly or it must be depleted by the end of the cycle depending on whether a cycle reduction or increase, respectively, is desired. The fuel bundle of this invention permits the exchange of absorber rods with any desired absorber atom concentration to accommodate such last minute changes in schedule.

In view of the foregoing examples and description of the present invention, it can be seen that the fuel bundle of the present invention makes it possible to adjust a fuel bundle to meet the immediate needs of a reactor. This may be performed on the reload fuel or on the irradiated reactor fuel not scheduled for replacement, as in Example 5. It is to be understood that the fuel bundle is not limited to the above described situations since there are many others where it also may apply.

In the foregoing only one specific illustration was shown for removing, inserting and locking the removable fuel rod and it is to be understood that this was only a preferred embodiment and that many other suitable arrangements could be provided. It is also to be understood that the present invention is not limited to 6 x 6 square array, but rather it may be used in larger or smaller square arrays wherein the removable rod openings could be provided generally along the diagonal as well as in positions symmetrical to this line. Furthermore, in certain situations it may be desirable to include fewer removable rod locations along this line or in symmetrical positions other than those previously described. As noted previously the invention is applicable to other than square fuel bundles in which the lines of removable rod positions may not literally be a "diagonal."

It is to be understood that the absorber materials which may be used in the removable rods of the present invention include but are not limited to the following gadolinium, europium, erbium, dysprosium, samarium, boron, thorium, Pu-240, U-238, etc. It has been found that gadolinium is a particularly effective burnable absorber because of its very large thermal neutron cross section resulting in high self-shielding characteristics. Because of this self-shielding characteristic the depletion of the gadolinium isotopes in a cylindrical geometry yields a linear fixed absorber strength depletion with exposure. Linear depletion of the fixed control system strength is desirable from the standpoint of reactor operation since the reactivity of the fuel decreases linearly with exposure. Therefore, these two linear relations may be made the same, thereby resulting in a constant fuel bundle reactivity with exposure. In addition, it may be desirable to embody either fissile or fertile material or both in the removable rod.

Various embodiments of this invention have been described and it should be understood that various other modifications and adaptations thereof may be made by those skilled in this particular art without departing from the spirit and scope of this invention as set forth in the following claims.

We claim:

1. A fuel bundle for use in a nuclear reactor comprising a plurality of rods, each rod comprising material selected from the group consisting of (1) fuel material, (2) fuel material mixed with a special neutron absorber, (3) inert or diluent material mixed with a special neutron absorber, and (4) a special neutron absorber material without additives, said rods being arranged in a predetermined geometric array, said plurality of rods including at least one removable rod, a first tie plate positioned at one end of said fuel bundle and operatively connected to the ends of said plurality of rods, a second tie plate positioned at the other end of said fuel bundle and operatively connected to the other ends of said plurality of rods, said first and second tie plates operatively connecting said plurality of rods in a predetermined geometric array, said first tie plate including means forming at least one opening to permit removal or insertion of said removable rod, said means including a slot adjacent said opening that extends the entire thickness of said first tie plate, said removable rod including a locking mechanism that cooperates with said opening and said slot in said upper tie plate to retain said removable rod in a fixed position.

2. The fuel bundle of claim 1 wherein said means comprises an elongated cylindrical member that includes said slot and includes a notch disposed at a fixed angle from said slot, said notch extending partially through the thickness of said first tie plate, whereby said locking mechanism is engaged with said notch when said locking mechanism is in the locked position.

3. The fuel bundle of claim 1 wherein said second tie plate includes at least one receptacle, one end of said removable rod having a bullet-shaped nose region for insertion into said receptacle, a cylindrical region which has a close radial fit with said receptacle, and a conical region which rests against the surface of said second tie plate in a region adjacent said receptacle.

4. The fuel bundle of claim 1 wherein said removable rod includes a longitudinally extending cylindrical shank, said locking mechanism slideably and rotatably mounted on said shank, said locking mechanism including a pin which extends radially outward from said locking mechanism whereby said slot and said notch respectively receive said pin when said removable rod is mounted in said fuel bundle.

5. The fuel bundle of claim 4 wherein a compresion spring is disposed around said shank between the lower end of said locking mechanism and the upper end of said removable fuel rod to force said locking mechanism in a predetermined direction.

6. The fuel bundle of claim 5 wherein said locking mechanism includes a cylindrical locking sleeve that surrounds and is slideably and rotatably mounted on said shank, said pin operatively connected to and extending radially outward from the lower end of said sleeve.

7. The fuel bundle of claim 6 wherein the upper end of said shank includes a collar that prevents said cylindrical locking sleeve from being removed from the end of said shank.

8. The fuel bundle of claim 7 wherein the upper end of said sleeve is provided with a nut and a circumferential groove, whereby said nut provides means for rotating said locking mechanism and said groove provides means for removing and inserting said removable rod in said fuel bundle.

9. The fuel bundle of claim 8 wherein said slot includes chamfers at both ends, and said notch includes chamfers at one end.

References Cited

UNITED STATES PATENTS

| | | | |
|---|---|---|---|
| 3,015,616 | 1/1962 | Sturtz et al. | 176—78 |
| 3,057,793 | 10/1962 | Coates et al. | 176—76 X |
| 3,164,530 | 1/1965 | Banks | 176—78 X |
| 3,166,481 | 1/1965 | Braun | 176—78 X |
| 3,314,859 | 4/1967 | Anthony | 176—86 |

CARL D. QUARFORTH, *Primary Examiner.*

M. J. SCOLNICK, *Assistant Examiner.*

UNITED STATES PATENT OFFICE
CERTIFICATE OF CORRECTION

Patent No. 3,349,004            October 24, 1967

James L. Lass et al.

It is hereby certified that error appears in the above numbered patent requiring correction and that the said Letters Patent should read as corrected below.

Column 3, line 23, after "special" insert -- neutron --; line 62, for "thes" read -- these --; column 4, line 32, after "hexagonal" insert a comma; lines 38 and 39, for "descriptiion" read -- description --; column 5, line 9, for "corresponds" read -- correspond --; line 20, for "porticularly" read -- particularly --; column 6, line 52, for "typical" read -- typically --; column 7, line 47, for "form" read -- from --; line 71, for "rods" read -- rod --; column 8, line 54, for "coincide" read -- coincides --; line 68, for "grooove" read -- groove --; column 9, line 3, for "of" read -- to --; lines 20, 23 and 24, and lines 28 and 29, for the equation, each occurrence, $$\left(\frac{\Delta k}{k}\right)_F \quad\quad \text{read} \quad\quad \left(\frac{\Delta k}{k}\right)_F$$

same column 9, line 43, for "demensional" read -- dimensional --; same line 43, for "5" read -- (5) --; line 52, for "radium" read -- radius --; column 10, lines 23 and 28, for the equation, each occurrence, $$\left(\frac{\Delta k}{k_M}\right) \quad\quad \text{read} \quad\quad \left(\frac{\Delta k}{k}\right)_M$$

column 12, line 17, for "Decrease the movable control system strength" read -- Increase the uncontrolled infinite neutron multiplication --; same column 12, lines 45 and 63, for $$\left(k_x^{uc}\right) \quad\quad \text{read} \quad\quad \left(k_\infty^{uc}\right)$$

line 75, after "strength" insert -- of --; column 13, line 14, for "$k_x{}^{uc}$" read -- $k_\infty{}^{uc}$ --; column 14, line 22, for "return" read -- retain --; column 15, line 3, after "following" insert a colon; column 16, line 19, for "compresion" read -- compression --.

Signed and sealed this 11th day of March 1969.

(SEAL)
Attest:

EDWARD M. FLETCHER, JR.
Attesting Officer

EDWARD J. BRENNER
Commissioner of Patents